P. A. BANCEL.
METHOD OF AND APPARATUS FOR UTILIZING THE ENERGY OF STEAM.
APPLICATION FILED NOV. 29, 1912.
1,143,348.
Patented June 15, 1915.
3 SHEETS—SHEET 1.
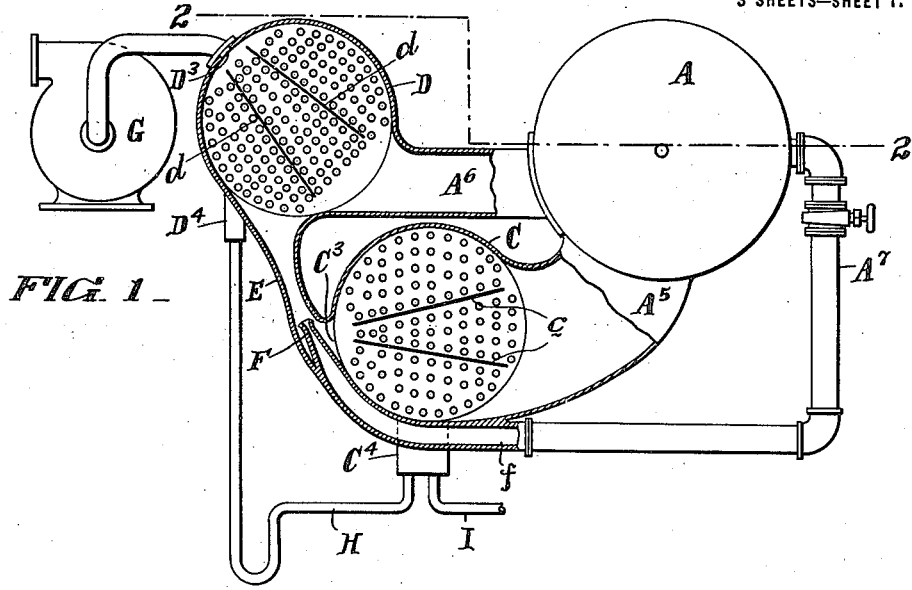
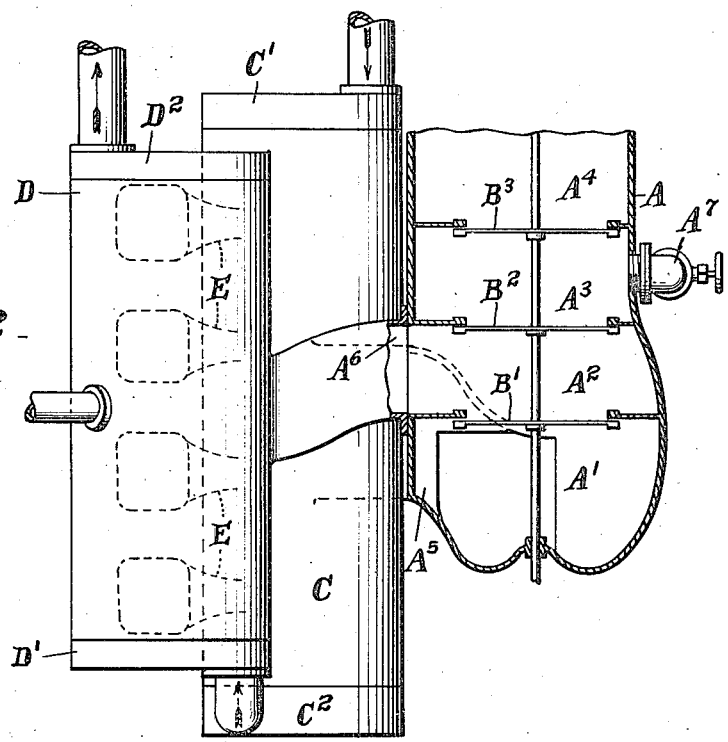
WITNESSES
INVENTOR
Paul A. Bancel
BY
ATTORNEY P. A. BANCEL.
METHOD OF AND APPARATUS FOR UTILIZING THE ENERGY OF STEAM.
APPLICATION FILED NOV. 29, 1912.
1,143,348.
Patented June 15, 1915.
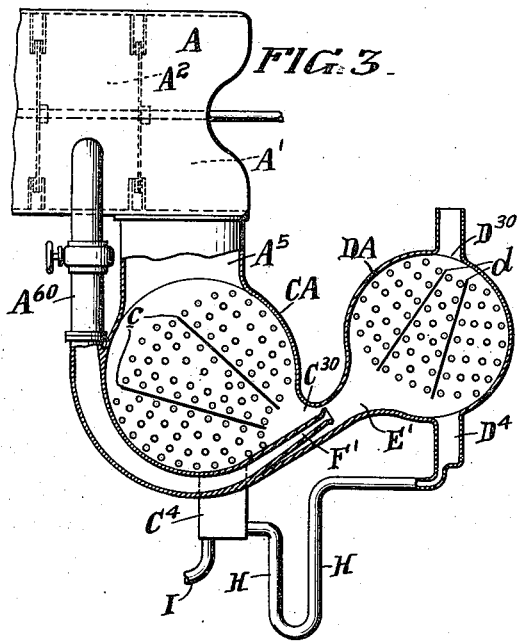
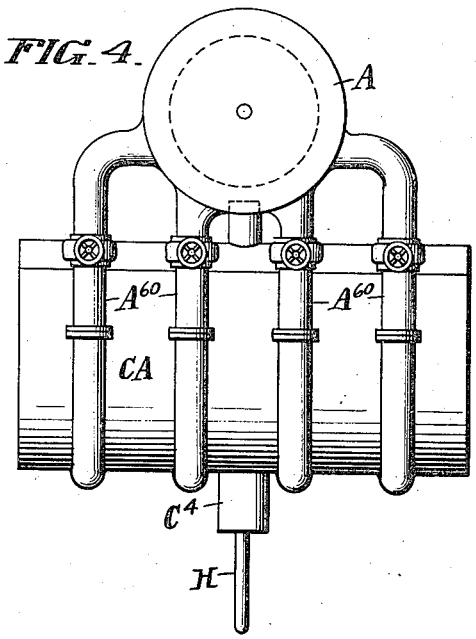
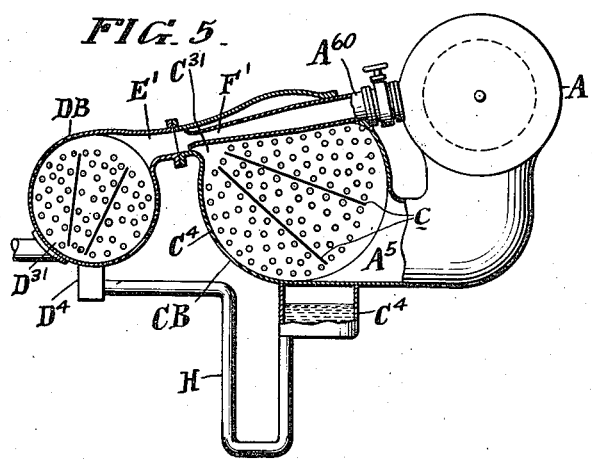
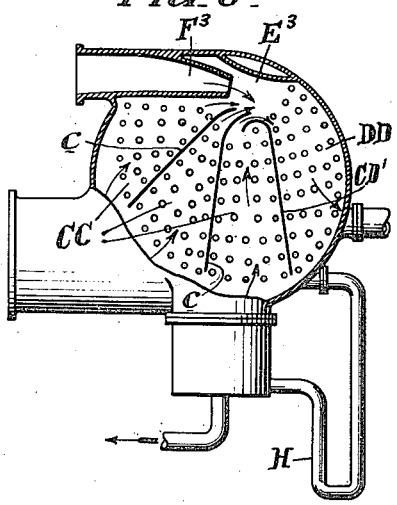

P. A. BANCEL.
METHOD OF AND APPARATUS FOR UTILIZING THE ENERGY OF STEAM.
APPLICATION FILED NOV. 29, 1912.
1,143,348.
Patented June 15, 1915.
3 SHEETS—SHEET 3.
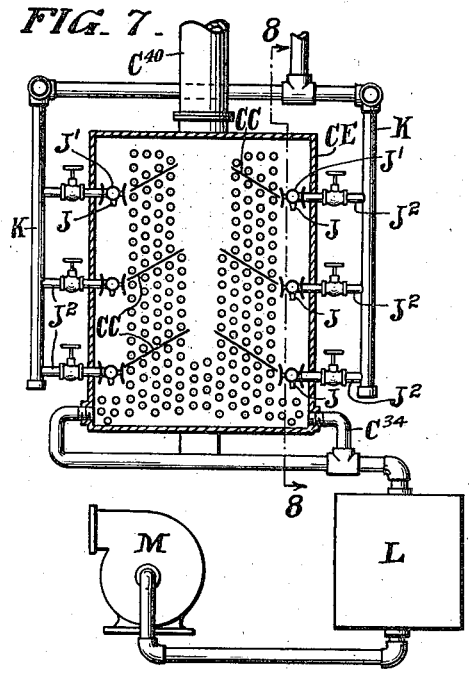
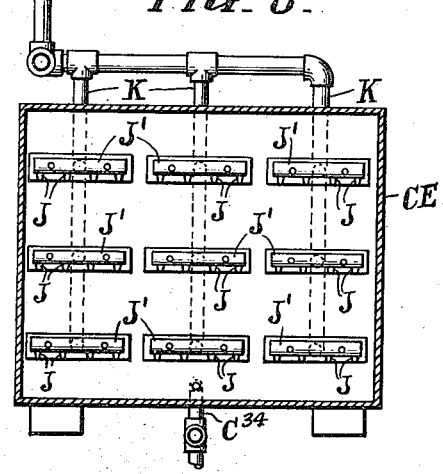
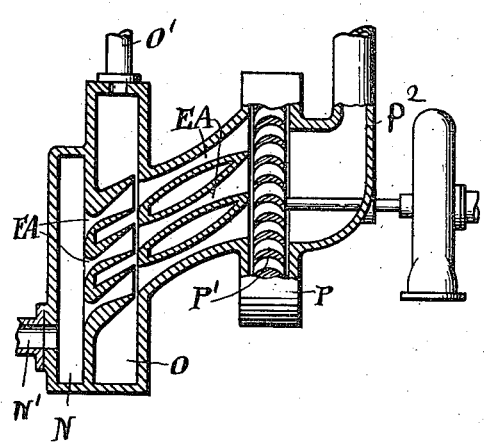
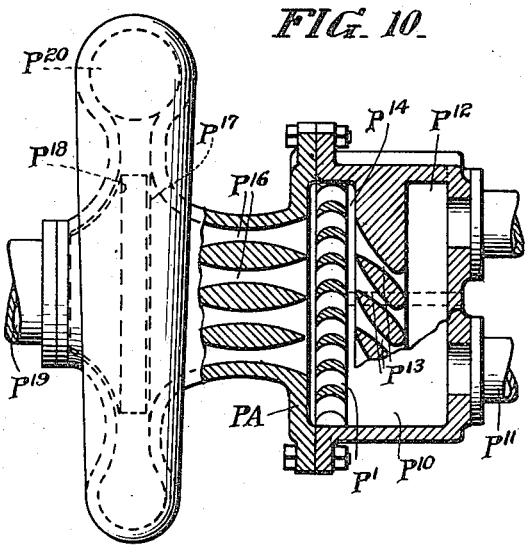

UNITED STATES PATENT OFFICE.

PAUL A. BANCEL, OF NEW YORK, N. Y., ASSIGNOR TO HIMSELF, AND GEORGE H. GIBSON, OF UPPER MONTCLAIR, NEW JERSEY.

METHOD OF AND APPARATUS FOR UTILIZING THE ENERGY OF STEAM.

1,143,348.  Specification of Letters Patent.  Patented June 15, 1915.

Application filed November 29, 1912. Serial No. 734,050.

*To all whom it may concern:*

Be it known that I, PAUL A. BANCEL, a citizen of the United States of America, residing in the city, county, and State of New York, have invented certain new and useful Improvements in Methods of and Apparatus for Utilizing the Energy of Steam, of which the following is a true and exact description, reference being had to the accompanying drawings, which form a part thereof.

The primary object of the present invention is to provide an improved method of and apparatus for utilizing the energy of steam in performing mechanical work, characterized by the relatively small bulk and consequently low cost of construction of the apparatus required for utilizing the energy in a satisfactorily efficient manner.

My invention pertains particularly to the utilization of the energy contained in low pressure steam, such as the exhaust steam from a high pressure turbine or reciprocating engine exhausting at a pressure at or somewhat below the pressure of the atmosphere. At the present time it is common practice to utilize the energy available in such low pressure steam by passing it through a low pressure turbine or additional low pressure turbine wheels, exhausting the total volume of steam into a main condensing apparatus in which a high vacuum is maintained by the use of a suitable vacuum producing and auxiliary condensing apparatus for removing the air from the main condensing apparatus, and condensing the steam mixed with the air thus withdrawn from the main condensing apparatus. By the term air, as used in this connection, I mean to include not only atmospheric air, but other gases and vapors entering the condensing apparatus and not condensible therein under normal conditions of operation.

My present invention pertains particularly to this general mode of utilizing the available energy in low pressure steam. In abstracting and using the available energy in low pressure steam, in accordance with the present invention, I expand the steam to convert its potential energy into kinetic energy and utilize all or a part of the kinetic energy thus made available in one portion of the steam to effect the proper distribution throughout the main condensing apparatus of not only this portion of the steam, but also of another portion of the steam from which I abstract and utilize as large a proportion of its available energy as is practically possible before passing it into the condensing apparatus. Preferably the air withdrawn from the main condensing apparatus with the steam admixed therewith is delivered to the vacuum producing and auxiliary condensing apparatus at a pressure above the minimum pressure maintained in the main condensing apparatus or in a portion thereof.

In the practical carrying out of my invention, I prefer to divide the condensing space of the main condensing apparatus into two separate and distinct portions, in one of which a higher vacuum is maintained than in the other, and I expand all or a major portion of the steam in the turbine and utilize the kinetic energy thus made available in imparting energy to the turbine wheels. In this expansion of the steam, however, one portion of the steam is expanded to a lower pressure in the turbine than is another portion. These two portions of the steam are passed into the higher and lower vacuum portions, respectively, of the main condenser. To withdraw the air from, and thereby maintain the vacuum in the higher vacuum condensing space, I utilize the jet action of all or a part of the steam passing to the condensing space having the lower vacuum to force said air into the last mentioned condensing space. The air withdrawn from the condensing space operating at the lower vacuum is passed to the vacuum producing and auxiliary condensing apparatus.

The following explanation may facilitate an understanding of the character of the advantageous results obtained by the use of my invention: The efficiency and output of a steam turbine, operating at constant speed, and receiving steam at a given initial pressure, depends primarily upon three factors, namely—the amount of steam passed through the turbine, the extent to which the steam is expanded in passing through the turbine, and the residual velocity, or kinetic energy of the steam leaving the turbine. With a given discharge pressure, the residual velocity of the steam will increase as the amount of steam passed through the turbine rises above the normal full load amount, and thus the efficiency of the turbine will decrease as the overload increases. With a given amount of steam passing through the turbine, a decrease in the pressure to which the steam is expanded in the turbine, will correspondingly increase the kinetic energy of the steam, but the resulting increase in volume of the steam necessitates a higher residual velocity in the steam to enable it to get through the low pressure wheel or wheels of the turbine when the turbine is operating at the normal full load or is overloaded. While lowering the exhaust pressure tends to directly increase the efficiency of the turbine, it does this at the expense of the capacity of the turbine, and when the turbine is heavily loaded the increased efficiency due to the lower exhaust pressure is substantially offset by the increased residual velocity of the steam.

When, in accordance with my present invention, a portion only of the steam is passed through the final wheel or wheels of the turbine, it is apparent that the leaving velocity of the steam thus receiving the greater expansion is appreciably less than would be the case if all of the steam were passed through the final wheel or wheels of the turbine. This portion of the steam receiving the greater expansion in the turbine is therefore utilized more efficiently in the turbine than would be the case if all of the steam were passed through the final wheel or wheels of the turbine. Furthermore, the potential energy remaining in the steam withdrawn from the turbine at the higher pressure is not wasted, but is converted into kinetic energy which is effectively utilized in creating the proper distribution of steam in, and circulation through the condensing apparatus. The necessity for utilizing relatively large amounts of kinetic energy to properly move the steam and air through the condenser, especially in the case of large condensers operating at high vacuum, has not heretofore been clearly appreciated, at least practically, in the design of such condensers. The frictional resistance to this movement is considerable on account of the velocity with which the highly attenuated steam and air must sweep through the condensing space, and the tortuous and restricted paths through which the steam and air must flow, and the cross and eddy currents within the condensing spaces set up by the changing temperature and pressure conditions prevailing in different portions thereof. The energy required for this purpose per pound of steam, increases approximately with the square of the velocity with which the steam moves through the condenser, and hence increases approximately as the square of the pressure in the condenser decreases. The efficiency of the condenser itself, as well as its capacity, is thus directly decreased by an increase in the vacuum maintained in the condenser. Furthermore, when the vacuum in the condenser is decreased, the corresponding increase in the temperature prevailing in the condenser permits the use of hotter cooling water, or of less cooling water of the same temperature than is required when the higher vacuum is maintained. The steam operating at the higher pressure is therefore condensed more efficiently and the total bulk of the main condensing apparatus is less than if all of the steam were condensed at the lower pressure. The division of the condenser into separate portions, receiving steam in parallel so to speak, shortens the paths traveled by the steam and consequently reduces the kinetic energy required to move the steam along these paths. While the efficiency of a steam jet as an air moving device is theoretically low, the practical efficiency of the steam jets which I employ to withdraw the air from the high vacuum condenser portion is good, for the jets may be located at the proper points to reduce the work required to remove the air and as the latter is compressed immediately at the air outlets it does not have to be forced in its highly attenuated condition through any appreciable length of piping. When, as in the preferred manner of carrying out my invention, the air from the portion of the main condenser operating at the higher vacuum is forced into a portion of the main condenser operating at a higher pressure by the jet action of steam not fully expanded in the turbine, an important advantage is had in that the volume of the air and steam mixture finally withdrawn from the main condenser by the auxiliary condensing and vacuum producing apparatus, is reduced. This makes it possible to reduce the bulk and cost of this final portion of the plant, the efficiency of which is also increased by increasing the pressure of the attenuated fluid handled by it.

The various features of novelty which characterize my invention are pointed out with particularity in the claims annexed to and forming a part of this specification. For a better understanding of the invention, however, and the advantages possessed by it, reference should be had to the accompanying drawings and descriptive matter, in which I have illustrated and described various modes of operation and forms of apparatus which may be employed in carrying out my invention.

Of the drawings: Figure 1 is a diagrammatic elevation partly in section of one form of apparatus which I may employ. Fig. 2 is a plan partly in section on the line 2—2 of Fig. 1. Fig. 3 is a partial sectional elevation of a modified form of apparatus.

Fig. 4 is an elevation taken at right angles to Fig. 3. Fig. 5 is a view taken similarly to Fig. 1, illustrating a second modification. Fig. 6 is a view taken similarly to Fig. 1, illustrating a third modification. Fig. 7 is a sectional elevation, illustrating a fourth modification. Fig. 8 is a partial sectional elevation taken on the line 8—8 of Fig. 7. Fig. 9 is an elevation partly in section, illustrating a fifth modification of my invention; and Fig. 10 is a sectional elevation, illustrating still another modification.

In the drawings, and referring first to the construction shown in Figs. 1 and 2, A represents a low pressure steam turbine, conventionally illustrated as divided into four chambers $A'$, $A^2$, $A^3$ and $A^4$ by the turbine wheels $B'$, $B^2$ and $B^3$, and coöperating annular diaphragm portions of the turbine casing. Progressively increasing pressures are maintained in these chambers, for instance the pressures in the chambers $A'$, $A^2$, $A^3$ and $A^4$ may correspond respectively to inches of vacuum as follows: $28\frac{1}{2}$, 28, 24 and 20, the steam being expanded and imparting energy to the corresponding turbine wheel as it passes from each chamber of the higher pressure into the adjacent chamber of low pressure. From the chamber $A'$ an outlet passage $A^5$ leads to the steam inlet of a surface condenser C, and a steam outlet passage $A^6$ leads from the chamber $A^2$ to the steam inlet of a surface condenser D. The condenser C is formed with cooling water inlet and outlet chambers $C'$ and $C^2$ at its ends, and similarly the condenser D is provided with cooling water inlet and outlet chambers $D'$ and $D^2$. Preferably the outlet chamber $C^2$ of the condenser C is connected to the inlet chamber $D'$ of the condenser D, so that the cold water first passes through the condenser C and then through the condenser D, as indicated by the arrows in Fig. 2. The air outlet $C^3$ from the condensing space of the condenser C is connected to the condensing space of the condenser D adjacent to the steam inlet of the latter by a plurality of nozzles E. Each nozzle E also receives steam from the chamber $A^3$ of the turbine through a corresponding alined nozzle F, the steam chest $f$ to which nozzles F are connected and the pipe $A^7$. The nozzles F are expansion nozzles and the nozzles E are compression nozzles and each pair of nozzles E and F are so relatively arranged and proportioned that the steam issuing from each nozzle F will be expanded to a pressure at or slightly below the vacuum of say $28\frac{1}{2}$ inches, which it is desired to maintain in the condenser C, while the steam and air and steam drawn out of the air outlet $C^3$ of the condenser C, by the jet action of the steam issuing from the nozzle F, will be compressed as it passes through the nozzle F, to the pressure of say 28 inches of vacuum, which it is desired to maintain in the condenser D. The air outlet $D^3$ from the condenser D is connected to the vacuum producing and auxiliary condensing apparatus which in Fig. 1 is conventionally illustrated as consisting of a wet air pump G. The hot wells or water of condensation outlets $C^4$ and $D^4$ of the condensers C and D are connected through the seal H, and the pipe I running from the hot well $C^4$ is connected to a suitable pump (not shown) for removing the water of condensation formed in the condensers C and D. Though not strictly essential, baffles or division plates $c$ and $d$ are preferably arranged, as shown, within the condensers C and D in such manner as to insure a direct flow of steam from the steam inlet to the air outlet of each condenser, and the avoidance of pockets in the condenser in which the air, or an air and steam mixture rich in air, can collect and become stagnant.

Only a small portion of the total amount of steam passing through the turbine is required to create the jet action necessary for withdrawing the air from the high vacuum condenser C and forcing it into the lower vacuum condenser D. With the pressures prevailing in the different stages of the turbine suggested above, the amount of steam required for this purpose would be appreciably less than five per cent. of the total amount of steam passing through the turbine. The amount of steam required to produce the jet action necessary to maintain the desired differential in pressure of the two stages of the main condensing apparatus will obviously decrease with the pressure of the steam used as the motive fluid in the jets. If this steam were taken at boiler pressure less than one per cent. of the total volume of steam would be sufficient to maintain a difference in pressure in the two stages of the condensing apparatus corresponding to a half-inch of vacuum. Advantageously the turbine and condensing apparatus may be so proportioned that approximately one-half of the steam entering the chamber $A^2$ will pass into the chamber $A'$. By dividing the steam in this manner, it is possible to operate with a residual velocity of the steam entering the chamber $A'$ somewhat less than would exist if all of the steam entering the chamber $A^2$ were forced through a wheel double the diameter of the wheel $B'$ and having similarly spaced and proportioned buckets or vanes.

The apparatus shown in Figs. 3 and 4 differs from that shown in Figs. 1 and 2 in that all of the steam passed into the lower vacuum condenser DA directly from the turbine, is withdrawn from the chamber $A^2$ of the turbine through valved conduits $A^{60}$ which terminate in expanding nozzles F', which create the jets for withdrawing the air from the air outlets $C^{30}$ of the condenser CA. This air and steam issuing from the nozzles F is compressed up to the pressure which it is desired to maintain in the condenser DA in passing into the latter through the compression nozzles E'. In this form of apparatus the division plates $c$ converge downwardly from the steam inlet of the condenser C toward the air outlet $C^{30}$, and the air outlet $D^{30}$ toward which the division plates $d$ converge leads from the upper side of the condenser DA.

The modification shown in Fig. 5 differs from that shown in Figs. 3 and 4 only in the relative arrangements of the air and steam inlets of the two portions CB and DB into which the main condenser is divided. In this form the baffles $c$ converge toward the air outlet $C^{31}$ which is located adjacent the upper end of the condenser C and the baffle or division plates $d$ converge toward the air outlet $D^{31}$ which leads from the condenser DB adjacent its lower end.

In the form of apparatus shown in Fig. 6, the high vacuum condensing space CD and the low vacuum condensing space CC of the main condensing apparatus are formed in a single condenser structure, being divided by the diaphragm CD'. The expansion nozzles $F^3$ through which the steam withdrawn from the turbine at the higher pressure is conveyed to the condensing space DD coöperate, each with a compressing nozzle $E^3$ formed in the condenser structure, and connecting the spaces CC and DD.

In the form of apparatus shown in Figs. 7 and 8, the main condensing apparatus comprises a single structure CE having in reality but a single condensing space, although this is divided into compartments by the usual inclined rain plates $cc$ which are downwardly inclined toward the opposite sides of the condenser shell, and each of which serves to deflect the water of condensation, formed in the portion of the condensing space immediately above it, to the side of the condenser. Each of these rain plates $cc$ is spaced at its lower edge away from the adjacent side of the condenser shell. In the channels thus provided between the lower edges of the rain plates and the adjacent sides of the condenser are located a plurality of expansion nozzles J. As shown, these nozzles are connected in groups of three each to a corresponding pipe J'. Each pipe J' is connected by an individual valved connection $J^2$ to the supply piping K, receiving steam in accordance with the invention claimed herein from a stage of the turbine at a pressure higher than that existing in the final stage which exhausts directly into the condenser CE through the steam inlet $C^{40}$. The air outlet or outlets from the condenser CE, of which preferably there are a plurality, are connected by a pipe $C^{34}$ to the auxiliary condenser L, which may be a small condenser of the surface type, and which has its common steam and water outlet connected, as shown, to the mixed air and water pump M.

In the form of invention shown in Figs. 7 and 8 the kinetic energy of the higher pressure steam passing into the main condenser from the turbine through the nozzles J is not employed in moving the air from one condensing space into another condensing space in which a different and appreciably lower vacuum is maintained. The kinetic energy of the steam supplied by the nozzles J is directly employed however, in performing the work required in the condenser to obtain the proper steam distribution and circulation therein, and thus reduces the kinetic energy which would otherwise have to be furnished by steam entering the condenser through the steam inlet $C^{40}$. It follows, therefore, that the energy of the higher pressure steam thus utilized adds to the efficiency of the plant as a whole.

In Figs. 9 and 10 I have illustrated how the general principles of my invention may be utilized by means of apparatus quite different in form from the apparatus hereinbefore referred to.

In Fig. 9, P represents an auxiliary turbine, which may be employed to drive a small pump MA used in the power plant to which the auxiliary turbine pertains. The motive fluid for the turbine is directed against the blades of the turbine wheel P' through compression nozzles EA. These receive steam through the alined expansion nozzles EA leading from the chamber N and are also open at their inlet ends to a chamber O. The supply pipe N' for the chamber N may receive steam from an intermediate stage of the main turbine when the apparatus is used in accordance with the present invention. For instance, the pipe N' may be connected to or form an extension of the pipe $A^7$ of the arrangement shown in Fig. 1. In such case the pipe O' leading to the chamber O may be connected to the air outlet of the high vacuum section C of the multi-stage condenser shown in Fig. 1, and the exhaust outlet $P^2$ of the turbine P would then be connected to the low vacuum section D of the multi-stage condenser. Instead of this arrangement the pipe O' might be connected to the air outlet or outlets of such a condenser as the condenser CE shown in Figs. 7 and 8. In such case the pipe N' would be connected to a suitable source of steam, as for instance an intermediate stage of the main turbine exhausting into the condenser CE and the exhaust from the turbine P would be discharged into a suitable auxiliary condensing and vacuum creating apparatus. With the apparatus shown in Fig. 9 connected in the manner described, it will be apparent that the nozzles EA and FA form parts of a steam injector of which O is the mixing chamber and N the motive fluid inlet chamber. The air with the steam admixed therewith entering the mixing chamber O through the pipe O' will be recompressed by its passage through the nozzles EA to the pressure which it is desired to maintain in the low vacuum section of the multi-stage main condenser or in the auxiliary condensing apparatus as the case may be. By proceeding in the manner described it is possible to employ the kinetic energy available in the steam supplied by the pipe N not only to operate the turbine P, but also to effect the withdrawal of the air from a condensing chamber and the maintenance of a vacuum therein higher than the vacuum maintained in the low vacuum section of a main condenser or in an auxiliary condensing apparatus as the case may be, and but little more steam, or steam at but slightly higher pressure need be supplied to the auxiliary turbine and injection apparatus to compress the air and drive the turbine than would be needed for the latter operation alone. In Fig. 10 the casing of the turbine PA is provided with an air inlet chamber $P^{10}$ adapted to be connected by the pipe $P^{11}$ to the air outlet or outlets of a main condenser, such as the condenser CE of Figs. 7 and 8. It is also formed with a steam chamber $P^{12}$ located above the chamber $P^{10}$ through which steam may be supplied from an intermediate pressure stage of the turbine. Expansion nozzles $P^{13}$ opening from the chamber $P^{12}$ discharge against the buckets of the turbine wheel $P^7$ working in the wheel chamber $P^{14}$. The air chamber $P^{10}$ is open to the wheel chamber $P^{14}$ beneath the steam chamber. The pressure in the wheel chamber $P^{14}$ is thus that of the expanded steam as it leaves the nozzles $P^{13}$. The outlet from the wheel chamber $P^{14}$ for the steam and air passing through the wheel chamber is through compression nozzles $P^{16}$ discharging into the auxiliary condensing and vacuum producing apparatus which in this case is a rotary jet condenser and air compressor driven by the turbine wheel $P^9$. The rotary impeller $P^{18}$ of the former works in a chamber $P^{17}$ to which the nozzles $P^{16}$ lead. Hurling water is supplied to the impeller through the supply pipe $P^{19}$, and the air and water is discharged by the impeller into a diffusion chamber $P^{20}$.

It will be apparent of course, that the apparatus shown in Figs. 9 and 10 may be employed to maintain a pressure in the main condenser less than that prevailing in the auxiliary condensing and vacuum producing apparatus, regardless of whether the steam supplied to the auxiliary turbine is partially expanded in the main turbine having its main exhaust into the main condenser, or is exhaust steam from other auxiliaries, or is live steam, and I make no claim herein on the mechanism shown in Figs. 9 and 10, except as it is utilized in carrying out the methods or in the general combinations claimed herein, since the apparatus shown in Figs. 9 and 10, is not, standing by itself, my sole invention, but was invented jointly by George H. Gibson and myself, and is claimed in our joint application Serial No. 733,941 filed of even date herewith. Generic claims to certain features of invention, disclosed alike in this case and in my copending application, Ser. No. 789,422, filed September 12th, 1913, are made in the last mentioned application.

While in accordance with the provisions of the statutes I have illustrated and described the best forms of my invention now known to me, it will be apparent to those skilled in the art that various changes may be made in the form of the invention disclosed without departing from the spirit of my invention, and that under some conditions certain features of my invention may be used without a corresponding use of other features.

Having now described my invention, what I claim as new, and desire to secure by Letters Patent, is:

1. The method of utilizing and condensing low pressure steam which consists in abstracting and utilizing for power purposes unequal proportions of the energy in different fractional parts of the steam and mixing steam retaining a larger proportion of its energy with and thereby imparting a portion of its energy to steam retaining a smaller proportion of its energy and utilizing the energy available in both portions of the steam to effect the desired circulation and distribution of the steam in a condensing space or spaces.

2. The method of utilizing and condensing low pressure steam which consists in abstracting and utilizing for power purposes unequal proportions of the energy in different fractional parts of the steam, passing steam retaining a smaller proportion of its energy into one condensing space, withdrawing the uncondensed residue from said space and admixing with it steam retaining a larger proportion of its energy and utilizing the combined energy of the mixture to effect its flow into and distribution in a second condensing space.

3. The method of utilizing and condensing low pressure steam which consists in abstracting and utilizing for power purposes unequal proportions of the energy in different fractional parts of the steam, passing steam retaining a smaller proportion of its energy into one condensing space in which one vacuum is maintained, passing steam retaining a larger proportion of its energy into another condensing space in which a lower vacuum is maintained, and utilizing a portion of the energy of the last mentioned steam to force the uncondensed residue from the higher vacuum condensing space into the lower vacuum condensing space.

4. The method of utilizing and condensing low pressure steam which consists in abstracting and utilizing for power purposes unequal proportions of the energy in different fractional parts of the steam, passing steam retaining a smaller proportion of its energy into one condensing space in which one vacuum is maintained, passing steam retaining a larger proportion of its energy into another condensing space in which a lower vacuum is maintained, and passing steam retaining a still larger proportion of its energy into the same condensing space and utilizing the energy of the last mentioned steam to force the uncondensed residue from the higher vacuum condensing space into the lower vacuum condensing space.

5. The method of utilizing and condensing low pressure steam which consists in abstracting and utilizing for power purposes unequal proportions of the energy in different fractional parts of the steam, passing steam retaining successively larger proportions of energy into condensing spaces in which successively lower vacuums are maintained, and utilizing portions of the energy of the steam to force the uncondensed residue from a high vacuum condensing space into a lower vacuum condensing space.

6. The method of utilizing and condensing low pressure steam which consists in abstracting and utilizing for power purposes unequal portions of the energy in different fractional parts of the steam, passing steam retaining a smaller portion of its energy into a condensing space in which one vacuum is maintained, expanding the steam retaining a larger proportion of its energy to a pressure not exceeding that of said vacuum and admixing therewith the uncondensed residue from said condensing space, recompressing said mixture to a higher pressure and then passing the mixture into a second condensing space in which a higher vacuum than the first mentioned vacuum is maintained.

7. The method of utilizing and condensing low pressure steam which consists in abstracting and utilizing for power purposes unequal portions of the energy in different fractional parts of the steam, passing steam retaining a smaller portion of its energy into a condensing space in which one vacuum is maintained, expanding the steam retaining a larger proportion of its energy to a pressure not exceeding that of said vacuum and admixing therewith the uncondensed residue from said vacuum space, utilizing a portion of the kinetic energy of the expanded last mentioned steam directly for power purposes, and another portion of the energy in recompressing the mixture of steam and uncondensed residue to a higher pressure, and then passing the mixture into a second condensing space in which a vacuum lower than the first mentioned vacuum is maintained.

8. In combination, a multi-stage turbine, a condenser comprising a high vacuum section receiving exhaust steam from the low pressure stage of the turbine and a second section operating at a lower vacuum and receiving steam from an intermediate stage of the turbine, and means for forcing the uncondensed residue of the steam entering the high vacuum condenser section into the lower vacuum section.

9. Apparatus for condensing steam of two different pressures, comprising in combination, a high vacuum condenser section receiving low pressure steam, and a second section operating at a lower vacuum and receiving steam of a higher pressure, and steam injector means for forcing the uncondensed residue of the steam entering the high vacuum condenser section into the lower vacuum section.

10. Apparatus for condensing steam at two different pressures comprising in combination a high vacuum condenser section receiving the lower pressure steam, a lower vacuum section receiving the higher pressure steam, and steam injector provisions through which the higher pressure steam and uncondensed vapor from the high vacuum section are discharged into the low vacuum section.

11. In combination, a multi-stage steam turbine, condensing apparatus, an exhaust steam connection from the low pressure stage of the turbine to said condensing apparatus, an exhaust steam connection from an intermediate pressure stage of the turbine to said condensing apparatus, and means for utilizing within the condensing apparatus kinetic energy of the steam entering from the intermediate stage in effecting the distribution and circulation in the condensing apparatus of steam entering the latter from the low pressure stage of the turbine.

12. In combination, a multi-stage turbine, a multi-stage condensing apparatus, means for passing the steam from the low pressure stage of the turbine into one stage of the condensing apparatus in which one vacuum is maintained, and means for passing steam from an intermediate pressure stage of the turbine into a stage of the condensing apparatus in which a vacuum lower than the first mentioned vacuum is maintained, said last mentioned means including steam jet provisions by which the uncondensed residue from the higher vacuum stage of the condenser is forced into the lower vacuum stage.

PAUL A. BANCEL.

Witnesses:
J. RALPH GIBSON,
STANLEY D. BROWN.